US009938966B2

(12) United States Patent
Heathcoat, Jr. et al.

(10) Patent No.: US 9,938,966 B2
(45) Date of Patent: Apr. 10, 2018

(54) PUMP CONTROL SYSTEM AND METHOD (71) Applicant: Parker-Hannifin Corporation, Cleveland, OH (US)

(72) Inventors: David Mark Heathcoat, Jr., Greeneville, TN (US); Jason Lee Emmette, Greeneville, TN (US); Roger Paul Gray, Greeneville, TN (US); Somer Renee Malone, Chuckey, TN (US); Kirk Ayres Lola, Rutherfordton, NC (US); Kerry Todd Brock, Forest City, NC (US); Eli Cutshall, Mosheim, TN (US)

(73) Assignee: Parker-Hannifin Corporation, Cleveland, OH (US)

( * ) Notice: Subject to any disclaimer, the term of this patent is extended or adjusted under 35 U.S.C. 154(b) by 515 days.

(21) Appl. No.: 14/607,126

(22) Filed: Jan. 28, 2015

(65) Prior Publication Data
US 2015/0147191 A1 May 28, 2015

Related U.S. Application Data (63) Continuation of application No. PCT/US2013/052273, filed on Jul. 26, 2013.
(Continued)

(51) Int. Cl.
*F16D 39/00* (2006.01)
*F04B 1/20* (2006.01)
(Continued)

(52) U.S. Cl.
CPC .............. *F04B 1/20* (2013.01); *F04B 1/2085* (2013.01); *F04B 1/324* (2013.01); *F04B 17/03* (2013.01);
(Continued)

(58) Field of Classification Search
CPC .. F04B 1/14; F04B 1/146; F04B 1/148; F04B 1/20; F04B 1/2078; F04B 1/2085;
(Continued)

(56) References Cited

U.S. PATENT DOCUMENTS

| 1,533,399 A | * | 4/1925 | Dunlap | F16H 39/02 |
| | | | | 60/487 |
| 2,737,895 A | * | 3/1956 | Ferris | F04B 1/146 |
| | | | | 417/205 |

(Continued)

FOREIGN PATENT DOCUMENTS

EP 0129670 A2 1/1985

OTHER PUBLICATIONS

International Search Report and Written Opinion issued in co-pending International Application No. PCT/US2003/052273, European Patent Office, dated Oct. 14, 2013, 12 pages.

*Primary Examiner* — Thomas E Lazo
*Assistant Examiner* — Dustin T Nguyen
(74) *Attorney, Agent, or Firm* — McDonnell Boehnen Hulbert & Berghoff LLP (57) ABSTRACT

A zero turn mower vehicle 10 includes left and right hydrostatic transmissions 11a, 11b driving wheels 15a, 15b. The transmissions 11a, 11b each include a swashplate type axial piston hydraulic pump 17 having a swashplate 22. A system 12 and method controls each pump 17. A controller 31 receives input signals and provides output signals to electric motors 33a, 33b to control each swashplate 22. Operator interface input devices 30a, 30b provide inputs to controller 31. Angle sensors 35a, 35b provide additional inputs to controller 31. Displacement amplifiers 36a, 36b amplify displacement of each swashplate 22, and torque amplifiers 34a, 34b amplify torque of electric motors 33a, 33b.

18 Claims, 7 Drawing Sheets

Related U.S. Application Data (60) Provisional application No. 61/677,111, filed on Jul. 30, 2012.

(51) Int. Cl.
  *F04B 1/32* (2006.01)
  *F04B 49/12* (2006.01)
  *F16D 31/02* (2006.01)
  *F04B 17/03* (2006.01)
  *F16H 61/435* (2010.01)

(52) U.S. Cl.
  CPC .............. *F04B 49/12* (2013.01); *F16D 31/02* (2013.01); *F04B 2201/12051* (2013.01); *F16H 61/435* (2013.01)

(58) Field of Classification Search
  CPC .... F04B 1/29; F04B 1/295; F04B 1/30; F04B 1/32; F04B 1/322; F04B 1/324; F04B 1/326; F04B 1/328; F04B 2201/12041; F04B 2201/12051; F16H 61/435
  USPC ......................................................... 92/12.2
  See application file for complete search history.

(56) References Cited

U.S. PATENT DOCUMENTS

| | | | |
|---|---|---|---|
| 3,292,554 A * | 12/1966 | Hessler | F04B 1/14 417/269 |
| 3,611,429 A * | 10/1971 | East | G01D 15/24 192/65 |
| 4,994,004 A * | 2/1991 | Meijer | F01B 3/106 475/149 |
| 5,063,740 A | 11/1991 | Aihara | |
| 5,850,770 A * | 12/1998 | Rehage | B23Q 5/20 82/142 |
| 6,443,706 B1 | 9/2002 | Deininger et al. | |
| 6,481,203 B1 * | 11/2002 | Johnson | F04B 1/324 60/487 |
| 6,837,142 B1 | 1/2005 | Poplawski et al. | |
| 6,955,046 B1 | 10/2005 | Holder et al. | |
| 8,152,183 B1 | 4/2012 | Bell et al. | |
| 2006/0174614 A1 | 8/2006 | Dong et al. | |
| 2006/0230902 A1* | 10/2006 | Oberheim | B23D 45/046 83/522.15 |
| 2008/0277188 A1 | 11/2008 | Hauser et al. | |
| 2009/0088938 A1 | 4/2009 | Usukura | |
| 2009/0123293 A1* | 5/2009 | Gierer | A47L 5/22 417/17 |

* cited by examiner

PUMP CONTROL SYSTEM AND METHOD

CROSS REFERENCE TO RELATED APPLICATIONS

This application is a Continuation of International Application No. PCT/US2013/052273, filed on Jul. 26, 2013, which claims the benefit of U.S. Provisional Patent Application Ser. No. 61/677,111 filed Jul. 30, 2012, the disclosures of which are incorporated herein by reference in their entirety.

TECHNICAL FIELD

This invention relates generally to pump control systems and control methods and to vehicles including such systems and methods. More specifically, this invention relates to such systems and methods and vehicles that include an axial piston hydraulic pump having a swashplate tiltable about a swashplate tilt axis.

BACKGROUND OF THE INVENTION

Hydrostatic transmissions are well known and generally may include a hydraulic pump and a hydraulic motor. The hydraulic pump and the hydraulic motor may be arranged as separate components or may be combined together in an integral unit. Axial swashplate type hydraulic piston pumps are frequently used in many such hydrostatic transmissions. Such pumps generate a pump action by causing pistons to reciprocate within a piston bore, with reciprocation of the pistons being caused by a swashplate that the pistons act against as a cylinder barrel containing the pistons rotates. Pump fluid output flow or displacement for each revolution of the barrel depends on the bore size and the piston stroke as well as the number of pistons that are utilized. The swashplate can pivot about a swashplate pivot center or axis, and the swashplate pivot angle determines the length of the piston stroke. By changing the swashplate angle, the pump displacement can be changed as is known in the art.

With the swashplate at its extreme pivot angle relative to the axis of rotation of the barrel, a maximum fluid displacement is achieved. When the swashplate is centered at a right angle relative to the axis of rotation of the barrel, the pistons will not reciprocate and the displacement of the pump will be substantially zero. In some axial swashplate type piston pump designs, the swashplate has the capability of crossing over center which results in the pump displacement being generated at opposite ports. In an over center swashplate axial piston pump, each system port can be either an inlet or an outlet port depending on the pivot angle of the swashplate. Over center axial swashplate piston pumps are widely used in hydrostatic transmissions, to provide driving in both forward and reverse directions.

One use for hydrostatic transmissions is zero turn vehicles such as zero turn lawn mowers. A separate over center swashplate axial piston pump may drive a hydraulic motor and wheel on each side of the vehicle. When the swash plate angles of the two pumps are equal and the output flow rotates the wheels in the same direction at the same speed, the vehicle travels in a substantially straight line path in either the forward or the reverse direction. When the swash plate angles of the two pumps are not equal and the output flow rotates the wheels in the same direction but at different speeds, the output flow rotates one wheel faster than the other so that the vehicle will turn. When one of the pumps is rotating its associated wheel in one direction and the other pump is rotating its associated wheel in the other direction, the vehicle will make a zero radius turn. An operator interface allows the vehicle operator to control the swashplate angles of the separate over center swashplate axial piston pumps, to control straight line or turning or zero radius turns for the vehicle.

In such pumps and systems and methods and vehicles, a technical problem is to precisely control the swash plate angle of the pump in response to operator input. This is necessary, for example, to drive the vehicle in a straight line path in the forward or reverse direction, or to make smooth turns including zero turns, or to drive in confined areas under precise control. A further technical problem is to achieve this precise control with good operator feel characteristics, in a repeatable manner, with multiple inputs, and at a relatively low cost.

SUMMARY OF THE INVENTION

The present invention addresses these and other technical problems by providing in one embodiment a hydraulic pump control system and control method and vehicle including such system and method. A swashplate type axial piston hydraulic pump may have a swashplate tiltable about a swashplate tilt axis, a barrel with axial pistons disposed in the barrel, the barrel and pistons being rotatable about a barrel rotation axis relative to the swashplate, the pistons each being movable relative to the barrel along a straight line piston path, and the pistons having a stroke determined by the position of the swashplate. An electric motor may be drivingly connected to the swashplate for displacing the swashplate about the swashplate tilt axis in response to electrical command signals. An electrical controller may generate the electrical command signals in response to controller inputs. An operator interface may be connected to the electrical controller and provide one of the controller inputs in response to operator input. An angle sensor may provide another of the controller inputs in response to tilting displacement of the swashplate about the swashplate tilt axis.

The control system and method and vehicle in one embodiment may include a displacement amplifier between the swashplate and the angle sensor. The displacement amplifier may amplify tilting displacement of the swashplate and communicate the amplified tilting displacement to the angle sensor. The displacement amplifier may transmit driving torque between the swashplate and the angle sensor. The displacement amplifier may transmit driving torque between the electric motor and the swashplate.

The control system and method and vehicle in one embodiment may provide the displacement amplifier as a mechanical displacement amplifier. The displacement amplifier may include rotating displacement amplifying components that engage and drive one another. The displacement amplifier may include a flexible drive member. The displacement amplifier may include a first sprocket drivingly connected to the angle sensor and a second sprocket driving connected to the swashplate. The flexible member may extend between the first and second sprockets, and the first sprocket may be substantially smaller than the second sprocket whereby rotation of the second sprocket causes substantially greater rotation of the first sprocket.

The control system and method and vehicle in one embodiment may provide the displacement amplifier with an arcuate gear segment fixed to the swashplate for tilting displacement with the swashplate. The displacement amplifier may include a pinion fixed to the angle sensor. The arcuate gear segment and the pinion may each have a tooth root diameter, and the root diameter of the arcuate gear segment may be substantially greater than the root diameter of the pinion. The angle sensor may include a string sensor. The angle sensor may include a pulley, and the pulley may transmit torque between the pinion and the string sensor.

The control system and method and vehicle in one embodiment may provide the swashplate type axial piston hydraulic pump as an over center swashplate type pump. The vehicle may be a zero turn vehicle having prime mover and a hydrostatic transmission. The hydrostatic transmission may include the swashplate type axial piston hydraulic pump, and the prime mover may be drivingly connected to rotate the barrel of the pump.

The invention in one embodiment may provide a method of controlling a swashplate type axial piston hydraulic pump. The method may include providing an electric motor drivingly connected to the swashplate of the pump to tilt the swashplate about a swashplate tilt axis. The method may include providing an electrical controller generating command signals in response to controller inputs and communicating the command signals to the electric motor to control the electric motor, and communicating operator input to the controller to provide one of the controller inputs. The method may include generating a swashplate tilt signal proportional to swashplate tilting displacement, and communicating the swashplate tilt signal to the controller to provide another one of the controller inputs. The method may include amplifying the swashplate tilting displacement, generating an amplified swashplate tilt signal proportional to the amplified swashplate tilting displacement, and communicating the amplified swashplate tilt signal to the controller to provide another one of the controller inputs. The amplifying the swashplate tilting displacement may include using a mechanical amplifier. The transmitting driving torque between the electric motor and the swashplate may include using the mechanical amplifier. The generating an amplified swashplate tilt signal may include converting a mechanical amplified swashplate tilt signal to an electrical signal proportional to the mechanical amplified swashplate tilting displacement.

These and additional features of the invention are more fully described and particularly pointed out in the description and claims set out below, and this summary is not intended to identify key features or essential features of the claimed subject matter. The following description and claims and the annexed drawings set forth in detail certain illustrative embodiments of the invention, and these embodiments indicate but a few of the various ways in which the principles of the invention may be used. The claims set out below are incorporated by reference in this summary.

BRIEF DESCRIPTION OF THE DRAWINGS

Embodiments of this invention will now be described in further detail with reference to the accompanying drawings, in which.

DETAILED DESCRIPTION OF THE DRAWINGS

Figure 1:
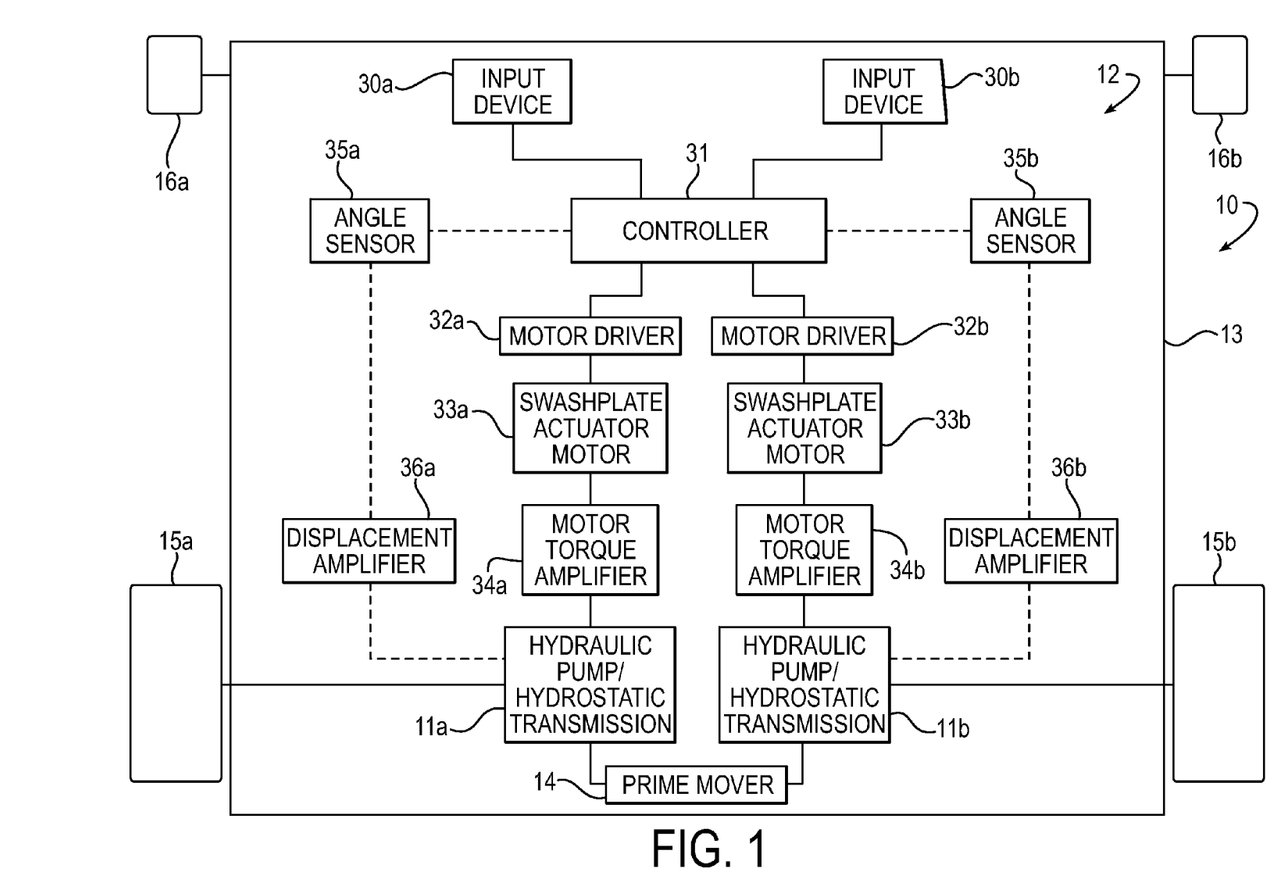
FIG. 1 is a schematic illustration of a system and vehicle and method according to a preferred embodiment of the present invention.

Referring now to the drawings in greater detail, FIG. 1 illustrates a vehicle 10 as viewed from the top of the vehicle. The vehicle 10 includes left and right hydrostatic transmissions 11a and 11b and a pump control system 12 operating according to a method described below. The hydrostatic transmissions 11a and 11b may be of any desired type, and in the preferred embodiment, for example, the hydrostatic transmissions 11a and 11b may each be of a type known as Parker Hannifin Corporation of Cleveland, Ohio Series HTE integrated hydrostatic transmission illustrated in Parker Hannifin catalog HY13-1595-002/US.

The vehicle 10 may be any type of suitable vehicle, and in the illustrated embodiment the vehicle 10 is, for example, a zero turn landscape grass mower which carries an operator (not shown) to drive the mower. The vehicle 10 includes a rigid frame 13 and a prime mover 14, which, for example, may be an internal combustion engine. The prime mover 14 is drivingly connected to each hydrostatic transmission 11a and 11b. The hydrostatic transmissions 11a and 11b are substantially identical transmissions that may be mirror images of one another in the preferred embodiment. Transmission 11a is drivingly connected to left rear wheel 15a to drive wheel 15a in a forward or reverse direction, and transmission 11b is drivingly connected to right rear wheel 15b to drive wheel 15b in a forward or reverse direction, all in a known manner. The vehicle 10 also includes left front wheel 16a and right front wheel 16b, which may be caster wheels in the preferred embodiment.

Each hydrostatic transmission 11a and 11b includes a conventional over center swashplate type axial piston hydraulic pump 17, one of which is illustrated in FIGS. 2-7. Pump 17 includes an input 18 that is drivingly connected to prime mover 14 to rotate a conventional pump barrel 19 (see FIGS. 6 and 7). A plurality of axial pistons 20 are disposed within the pump barrel 19 and rotate with the pump barrel 19 about a barrel axis 21. Pump 17 also includes a conventional over center swashplate 22 which is tiltable about a swashplate tilt axis 23. The pistons 20 are each movable relative to the barrel along a straight line piston path 24 that is substantially parallel to the barrel rotation axis 21, and the pistons 20 have a stroke determined by the position of the swashplate 22. When the swashplate 22 is in a neutral or center position perpendicular to the barrel axis 21, the stroke of the pistons 20 is substantially zero and the output fluid flow displacement from the pump 17 is substantially zero. When the swashplate 22 begins to be displaced or titled in either direction about its tilt axis 23, the stroke of pistons 20 begins to increase and output fluid flow displacement from the pump 17 begins. As the tilt angle of the swashplate 22 increases, the stroke of pistons 20 increases and the output fluid flow displacement from the pump 17 increases in a known manner. The output fluid flow displacement from pump 17 will be in one direction when the swashplate 22 is tilted in one direction from its neutral position and will be in the other direction when the swashplate 22 is tilted in the opposite direction. The output fluid flow from each pump 17 of each hydrostatic transmission 11a and 11b flows through conduits (not shown) to a hydraulic motor (not shown) of each hydrostatic transmission 11a and 11b, and such output flow rotates its associated hydraulic motor to rotate its associated wheel 15a and 15b in the forward or reverse direction in a known manner. A reservoir 25 provides hydraulic fluid to the pump 17, and a lever 26 opens and closes a fluid by-pass route (not shown) to enable pushing vehicle 10 when required.

Referring now to FIG. 1, control system 12 includes left operator interface input device 30a, which may, for example, be a conventional electrical joystick control or other suitable device that translates operator input to an electrical signal. Left input device 30a is connected to a conventional electronic controller 31 with a suitable hard wire or wireless connection and communicates a controller input signal to controller 31 in response to operator input. Electrical controller 31 generates electrical output command signals in response to various controller inputs, including the input from left input device 30a. These controller command signals are communicated to left motor driver 32a, to drive left electric stepper motor 33a. Left stepper motor 33a is drivingly connected to the swashplate 22 of left hydrostatic transmission 11a, for controlling and displacing the swashplate 22 about its swashplate tilt axis 23 in response to electrical command signals from controller 31. A left motor torque amplifier 34a is arranged intermediate motor 33a and swashplate 22 of hydrostatic transmission 11a, to increase the torque applied by motor 33a to swashplate 22.

A left displacement angle sensor 35a provides another of the controller 31 inputs through hard wire or wireless connection, in response to tilting displacement of swashplate 22 of left hydrostatic transmission 11a about its swashplate tilt axis 23. Specifically, angle sensor 35a converts a mechanical signal to an electrical signal and communicates to controller 31 an input signal indicating tilting displacement of its associated swashplate 22. A left displacement amplifier 36a is arranged between swashplate 22 of left hydrostatic transmission 11a and associated angle sensor 35a. The displacement amplifier 36a amplifies the tilting displacement of its associated swashplate 22 and communicates the amplified tilting displacement to its associated angle sensor 35a. In this manner, relatively small angular displacement of swashplate 22 of left hydrostatic transmission 11a is amplified and communicated as an amplified angular displacement input signal to controller 31, to increase accuracy and resolution of the angular displacement signal and increase controllability of swashplate 22.

In a similar manner, control system 12 includes a right input device 30b, a right motor driver 32b, a right electric stepper motor 33b, a right motor torque amplifier 34b, a right angle sensor 35b, and a right displacement amplifier 36b. These right side components are the same as and operate the same as the corresponding left side components described above, although certain components may be mirror images of one another as is known in the art. Also, the right input device 30b and the left input device 30a may be incorporated into a single component, such as for example a single joystick, if desired.

Turning now to FIGS. 2-7, a first preferred embodiment (FIGS. 2 and 3), a second embodiment (FIGS. 4 and 5), a third embodiment (FIG. 6) and a fourth embodiment (FIG. 7) of the present invention as used on the vehicle 10 and system 12 and method of FIG. 1 are illustrated. In FIGS. 2-7, the reference numbers and description apply to both the left side components and the right side components of the control system 12 that is illustrated in FIG. 1. While reference numbers with a suffix letter "a" are used to designate left side components and reference numbers with a suffix letter "b" are used to designate right side components in FIG. 1, these same reference numbers with no suffix are used generically in FIGS. 2-7 to designate components that may be used on both the left side and the right side. Of course, as is known, the described hydrostatic transmissions and associated components used on left and right sides of the zero turn vehicle 10 may be mirror images of one another but otherwise identical.

Figure 2:
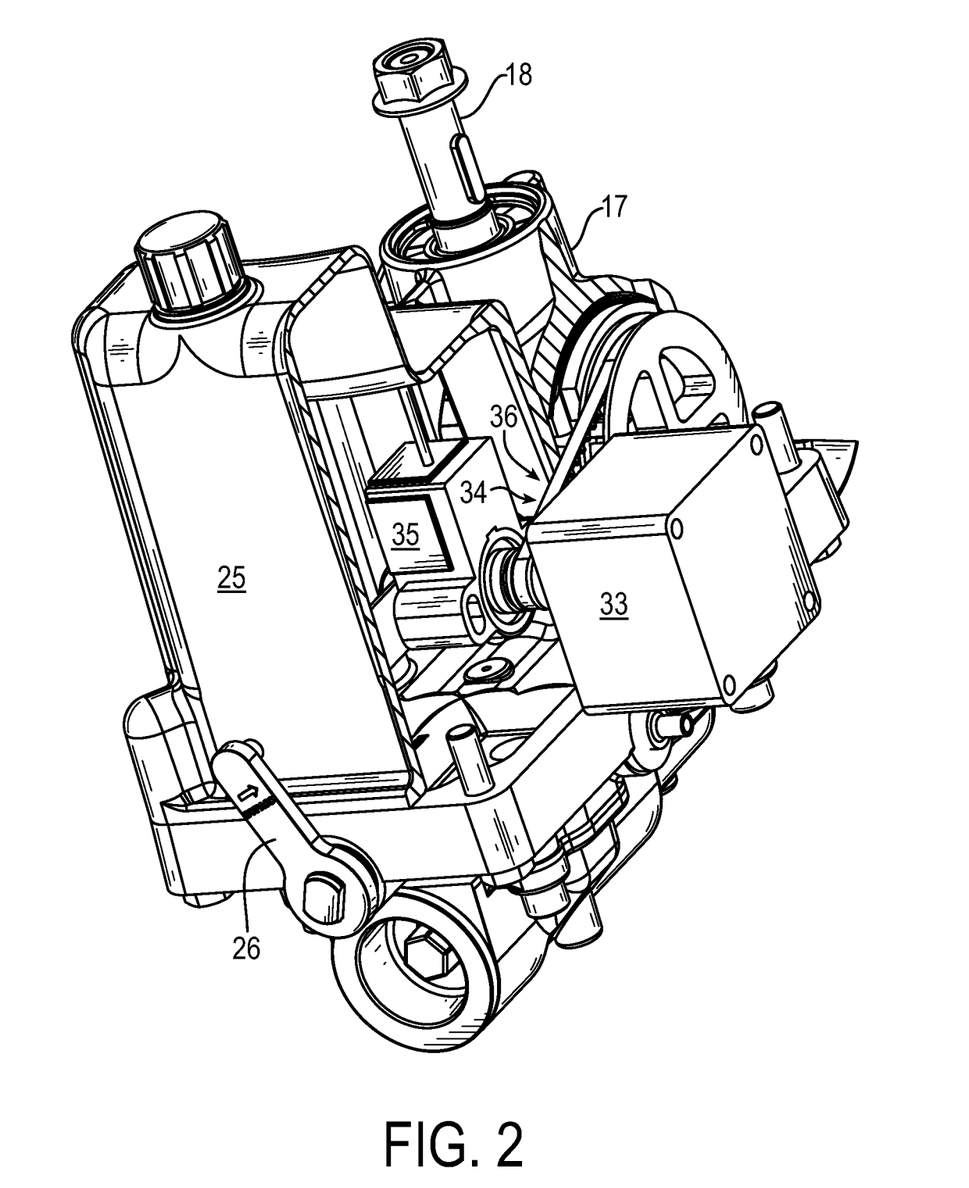
FIG. 2 is a perspective view of certain components of the system and vehicle and method illustrated in FIG. 1, with some components shown in cross section for clarity.
Figure 3:
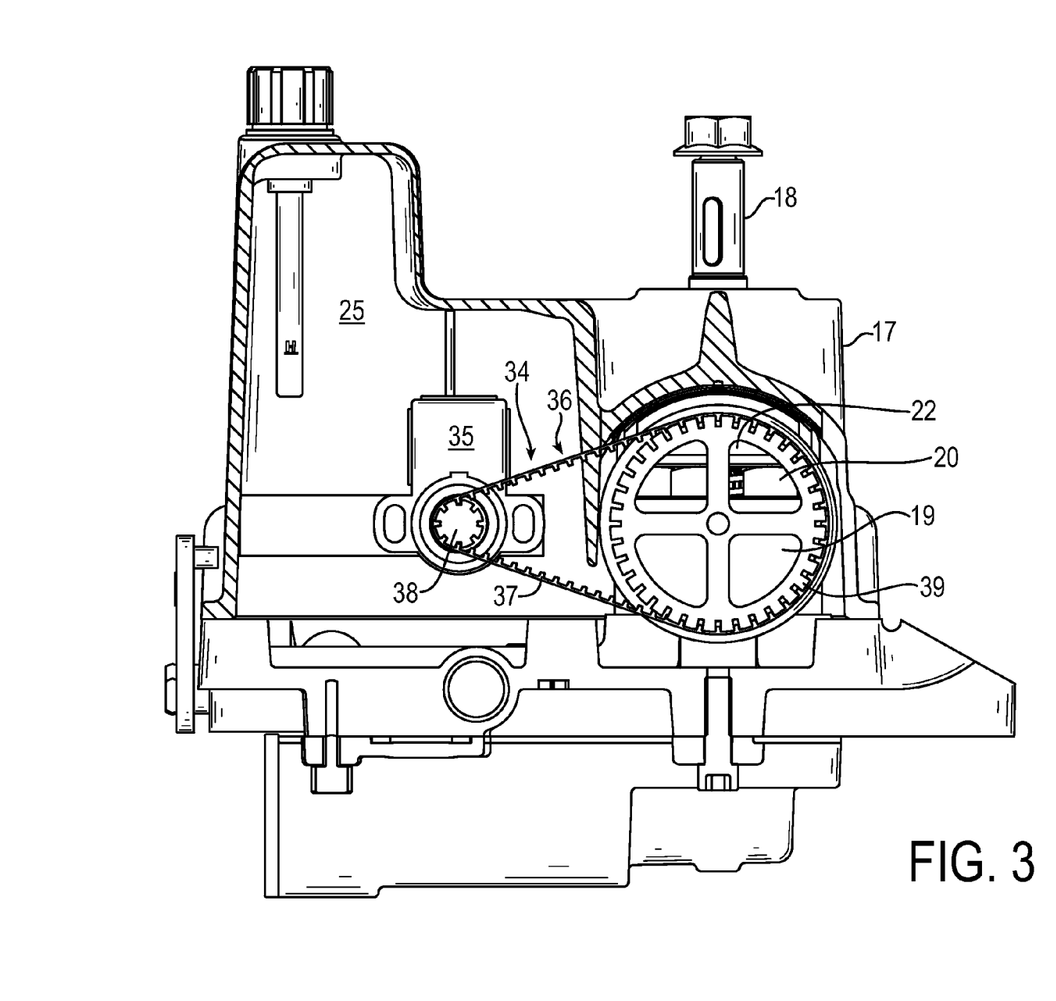
FIG. 3 is a side view of the components of FIG. 2.

Referring now to FIGS. 2 and 3, a preferred embodiment of the pump 17 of hydrostatic transmission 11, electric stepper motor 33, angle sensor 35, displacement amplifier 36 and torque amplifier 34 is illustrated. Displacement amplifier 36 is a mechanical amplifier that transmits motion and torque between the swashplate 22 and the angle sensor 35, and displacement amplifier 36 includes a flexible drive member 37 connecting a first sprocket 38 and a second sprocket 39. Flexible drive member 37 is a synchronous belt in the preferred embodiment and alternatively may be a chain or other suitable member. Sprocket 38 is drivingly connected to the angle sensor 35, for example by being drivingly connected to a rotating input shaft (not shown) of conventional angle sensor 35. Sprocket 39 is drivingly connected to swashplate 22 of the pump 17, for example by a pin or bushing (not shown), so that sprocket 39 and swashplate 22 tilt or rotate together under all conditions. The root diameter of the sprocket 39 is substantially larger than the root diameter of the sprocket 38 by a factor X, so that tilting displacement of swashplate 22 and sprocket 39 through a displacement angle Y produces a greater angular displacement of angle sensor 35 equal to X times Y. Similarly, torque amplifier 34 also includes member 37 connecting sprocket 38 and sprocket 39. Sprocket 38 is also drivingly connected to the electric motor 33, for example by being drivingly connected to a rotating output shaft (not shown) of motor 33. Due to the previously described ratio of sprocket 38 and sprocket 39, torque from electric motor 33 to drive and tilt swashplate 22 is multiplied by X. In this manner, the displacement amplifier 36 also transmits driving torque between the motor 33 and the swashplate 22 and thereby also provides the motor torque amplifier 34.

Figure 4:
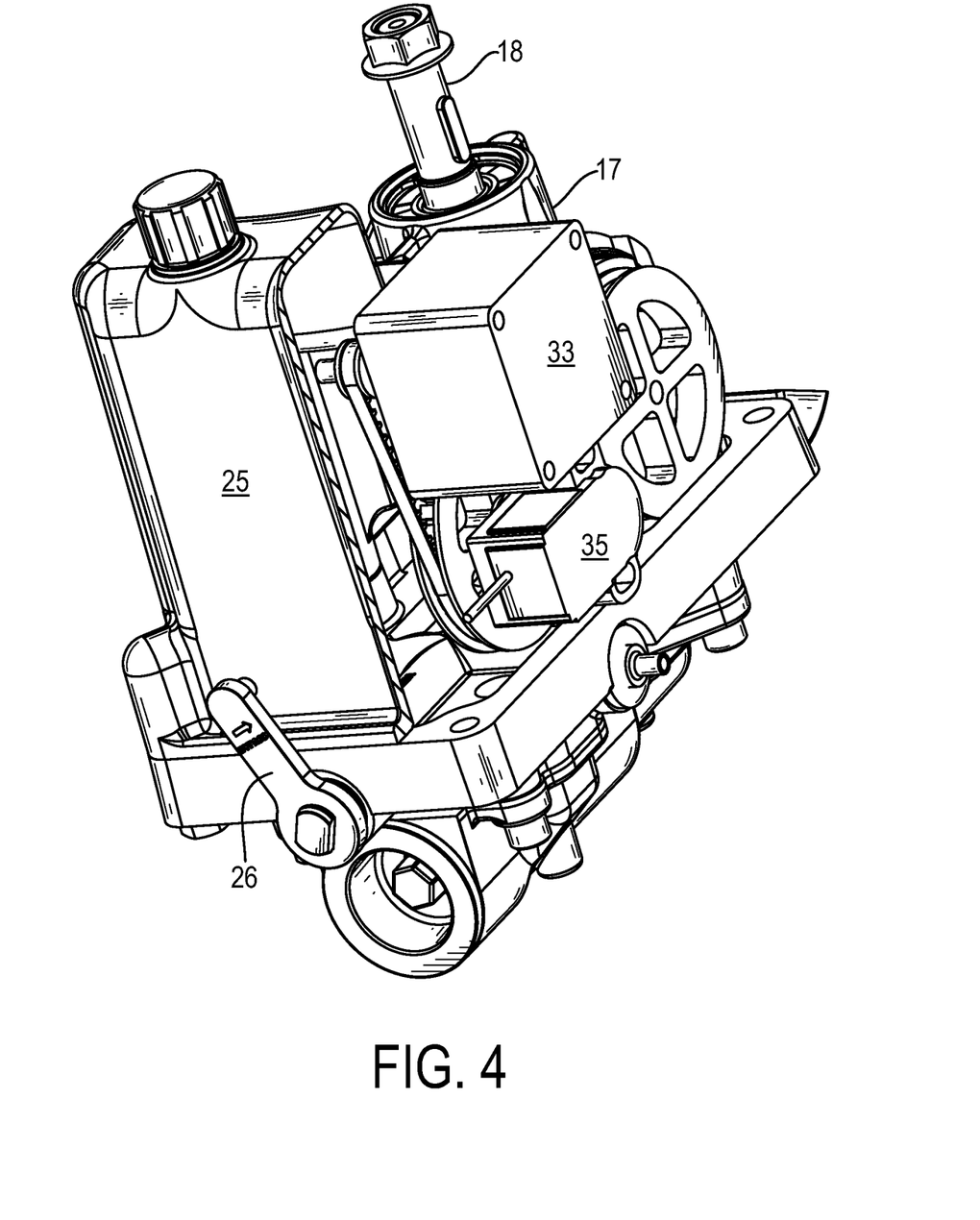
FIG. 4 is a perspective view of certain alternate components of the system and vehicle and method illustrated in FIG. 1, with some components shown in cross section for clarity, to illustrate a second embodiment of the present invention.
Figure 5:
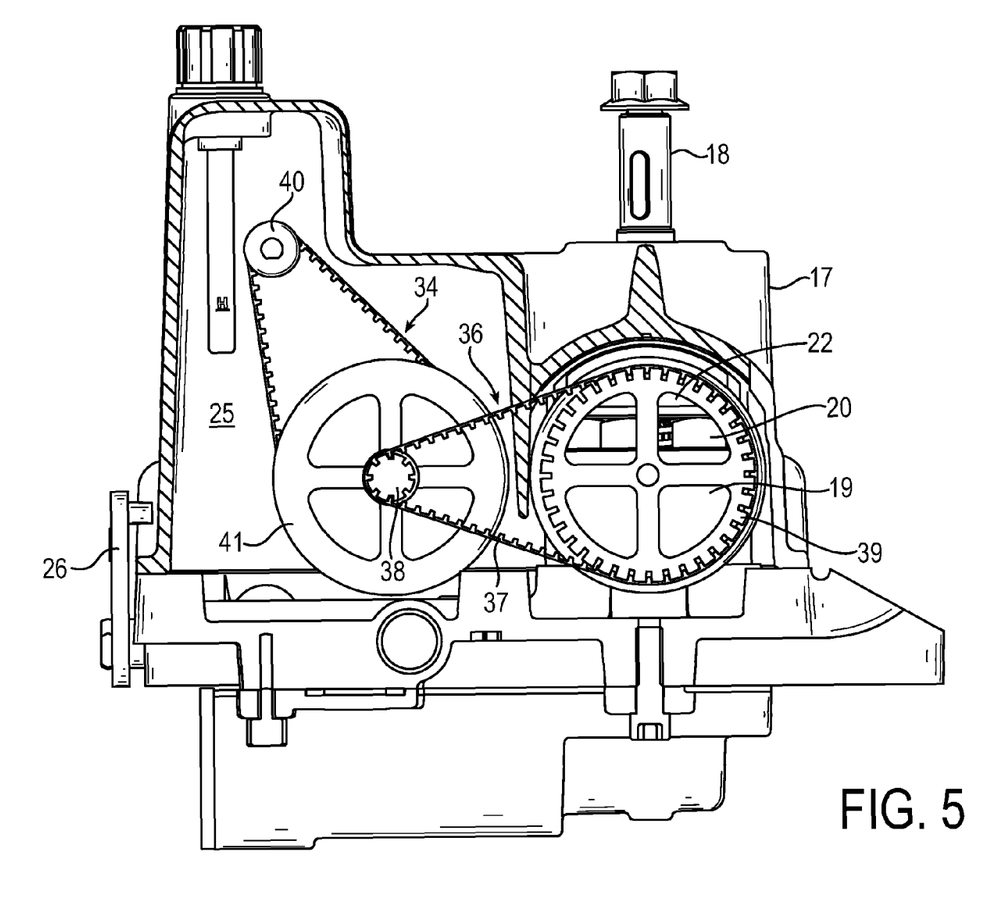
FIG. 5 is a side view of the components of FIG. 4.

Referring now to FIGS. 4 and 5, a second embodiment of displacement amplifier 36 and torque amplifier 34 is illustrated. Displacement amplifier 36 in FIGS. 4 and 5 is structurally and functionally the same as described above with reference to FIGS. 2 and 3, with the exception that the angle sensor 35 in FIGS. 4 and 5 is on the opposite side of sprocket 38. Torque amplifier 34 in FIGS. 4 and 5 further includes a sprocket 40 drivingly connected to electric motor 33. Sprocket 40 drives a sprocket 41 through a second flexible drive member, which in the preferred embodiment is a synchronous belt but alternatively may be a chain or asynchronous belt or other suitable member. Sprocket 40 and sprocket 41 provide torque amplification Z, so that the torque from electric motor 33 to drive and tilt swashplate 22 is multiplied by X times Z where Z may be equal or unequal to X.

Figure 6:
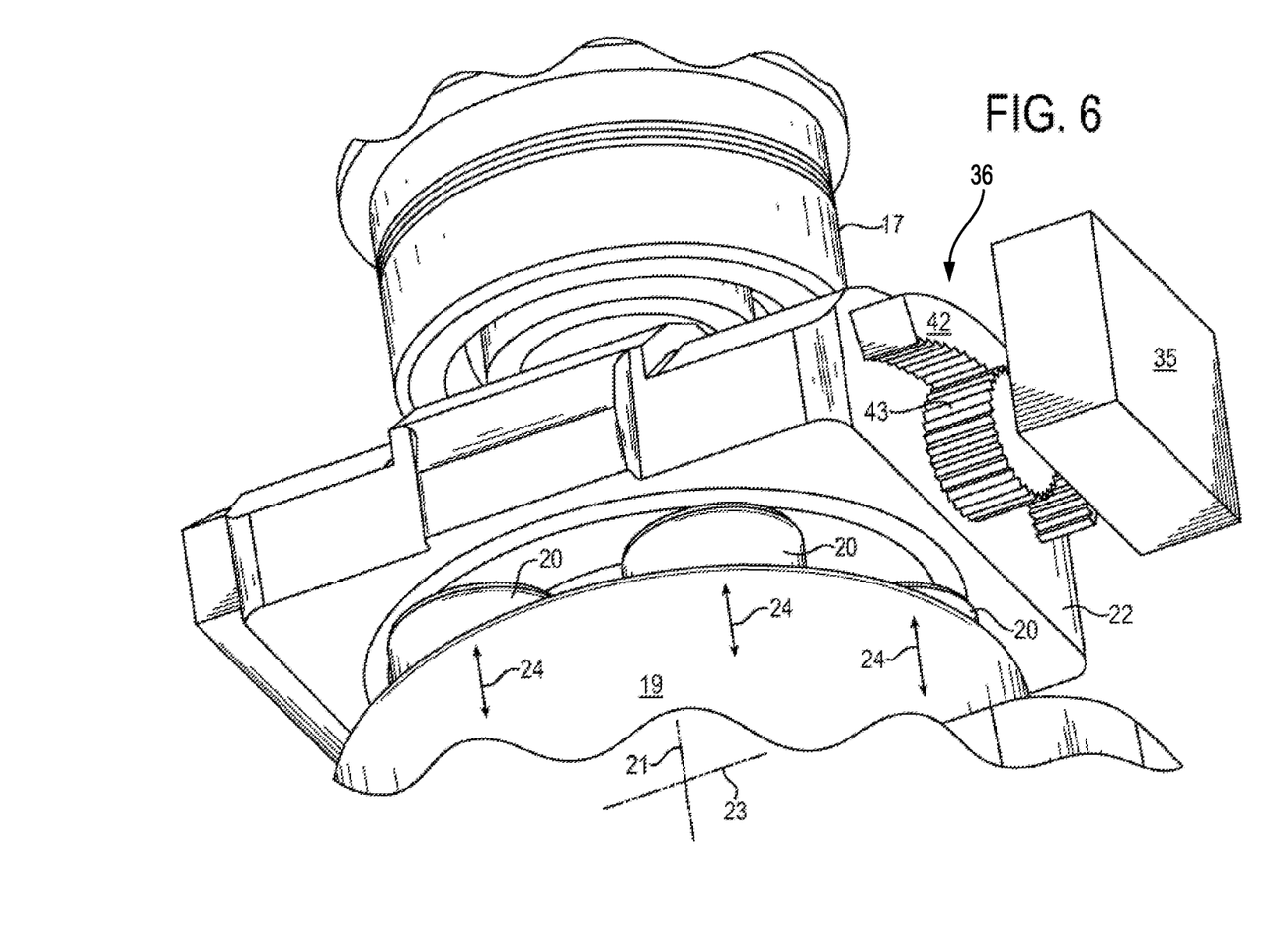
FIG. 6 is an enlarged perspective view of certain other alternate components for the system and vehicle and method illustrated in FIG. 1, to illustrate a third embodiment of the present invention.

Referring now to FIG. 6, a third embodiment of displacement amplifier 36 is illustrated. Displacement amplifier 36 in FIG. 6 includes an arcuate gear segment 42 drivingly connected to swashplate 22 for rotating or tilting movement with swashplate 22. A pinion 43 is drivingly secured to an input shaft of angle sensor 35. The root diameter of the arcuate gear segment 42 is substantially larger than the root diameter of the pinion 43 by a factor X, so that tilting displacement of swashplate 22 and arcuate gear segment 42 through a displacement angle Y produces a greater angular displacement of angle sensor 35 equal to X times Y. In the embodiment illustrated in FIG. 6, the torque amplifier 34 is mounted on the side of swashplate 22 opposite the gear segment 43 and is therefore not seen in FIG. 6. However, the torque amplifier 34 in the embodiment of FIG. 6 is otherwise structurally and functionally the same as that illustrated in FIGS. 2 and 3.

Figure 7:
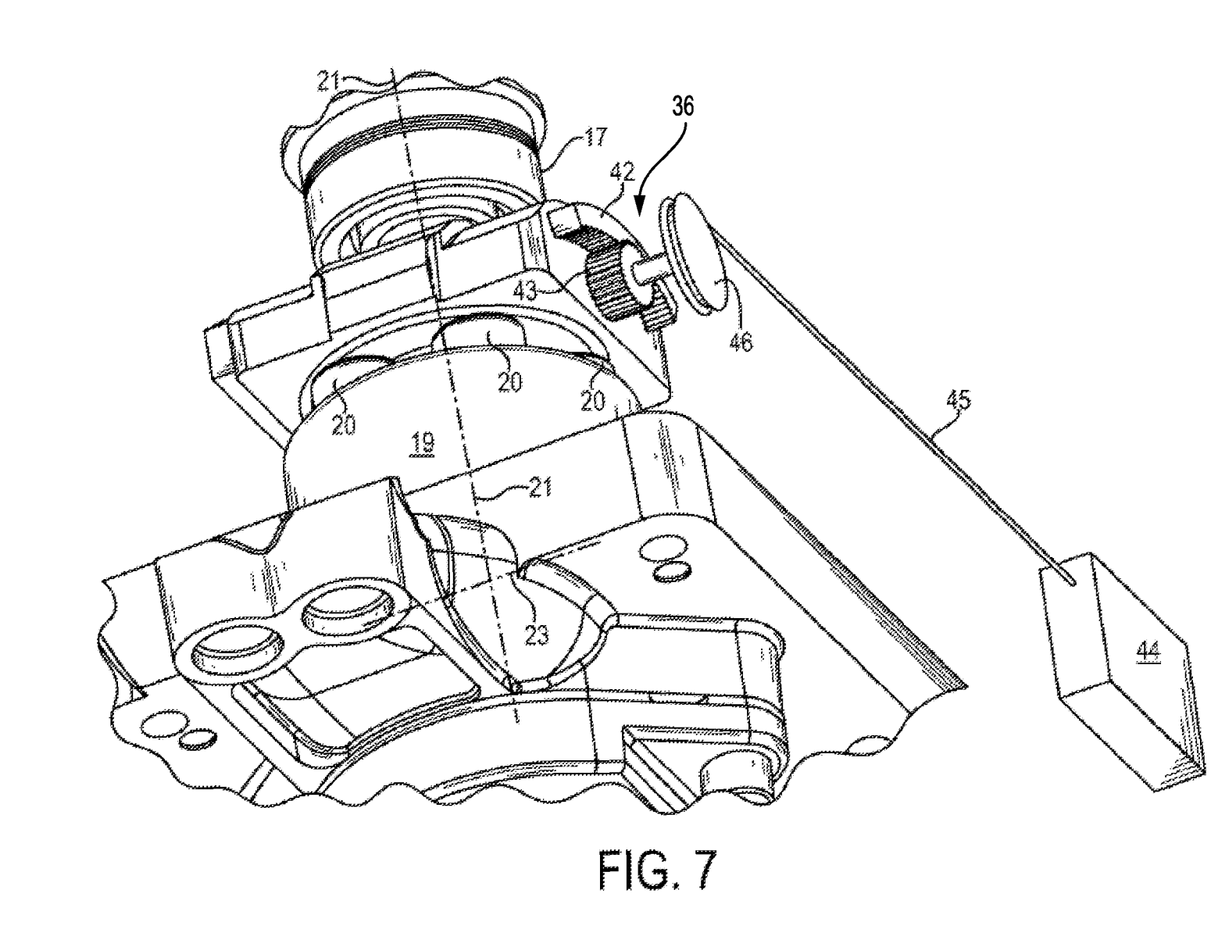
FIG. 7 is an enlarged perspective view of certain other alternate components for the system and vehicle and method illustrated in FIG. 1, to illustrate a fourth embodiment of the present invention.

Referring now to FIG. 7, a fourth embodiment of displacement amplifier 36 is illustrated. Torque amplifier 34 in the embodiment of FIG. 7 is structurally and functionally the same as described above in connection with FIG. 6. Displacement amplifier 36 in FIG. 7 is structurally and functionally the same as illustrated in FIG. 6, with the exception that the angle sensor 35 of FIG. 6 is replaced with a conventional string type displacement sensor 44 in FIG. 7. Sensor 44 may, for example, be a string potentiometer or a string Hall effect sensor. Sensor 44 includes a flexible member 45, which may for example be a string, with the term string meaning a string or wire of any desired material that wraps around a pulley 46 that is drivingly secured to pinion 43 to transmit an amplified angle signal and pulling torque from swashplate 22 to sensor 44. The pulley 46 converts the amplified angle signal from pinion 43 to a linear displacement which is sensed by sensor 44. Increasing the diameter of pulley 46 relative to the root diameter of pinion 43 increases the linear displacement of member 45 per angle traveled by pinion 43. Tilting displacement of swashplate 22 and gear segment 42 through a displacement angle Y produces an angular displacement of X times Y for the pinion 43 and pulley 4, where X is the ratio of root diameter of gear segment 42 to the root diameter of pinion 43. The linear displacement of the member 45 is equal to X times Y times R, where R is the effective radius of pulley 4 and the angular displacement X times Y is given in radians. Thus, the pulley 46 may provide additional amplification of the swashplate 22 displacement.

As illustrated in FIGS. 1-7 and described above, the present invention further provides a method of controlling a swashplate type axial piston hydraulic pump 17. The method includes providing an electric motor 33 drivingly connected to the swashplate 22 of the pump 17 to tilt the swashplate 22 about a swashplate tilt axis 23. The method further includes providing an electrical controller 31 generating command signals in response to controller inputs and communicating the command signals to the electric motor 33 to control the electric motor 33. The method further includes communicating operator input 30 to the controller 31 to provide one of the controller inputs. The method further includes generating a swashplate tilt signal proportional to the swashplate tilting displacement, and communicating the swashplate tilt signal to the controller to provide another one of the controller inputs. The method further includes amplifying by amplifier 36 the swashplate tilting displacement, generating an amplified swashplate tilt signal proportional to the amplified swashplate tilting displacement, and communicating the amplified swashplate tilt signal to the controller to provide another one of the controller inputs. The method further includes amplifying the swashplate tilting displacement using a mechanical amplifier 36. The method further includes transmitting driving torque between the electric motor and the swashplate using the mechanical amplifier. The method further includes the generating an amplified swashplate tilt signal including converting a mechanical amplified swashplate tilt signal to an electrical signal proportional to the mechanical amplified swashplate tilting displacement.

Although the principles, embodiments and operation of the present invention have been described in detail herein, this is not to be construed as being limited to the particular illustrative forms disclosed. For example, the synchronous belt and sprockets and the gears and pinions described herein may in alternative embodiments not illustrated in the drawings be replaced with other suitable or equivalent displacement amplifying and/or torque amplifying components, including other rotating displacement amplifying components that engage and drive one another. It will thus become apparent to those skilled in the art that various modifications of the embodiments herein can be made without departing from the spirit or scope of the invention.

The invention claimed is:

1. A pump control system comprising:
   an axial piston hydraulic pump having a swashplate tiltable about a swashplate tilt axis, a barrel with axial pistons disposed in the barrel, the barrel and pistons being rotatable about a barrel rotation axis relative to the swashplate, the pistons each being moveable relative to the barrel along a straight line piston path, and the pistons having a stroke determined by the position of the swashplate,
   an electric motor mounted to a motor shaft and drivingly connected to the swashplate for displacing the swashplate about the swashplate tilt axis in response to electrical command signals,
   an electrical controller generating the electrical command signals in response to controller inputs,
   an operator interface connected to the electrical controller and providing one of the controller inputs in response to operator input,
   an angle sensor mounted to a sensor shaft for providing another of the controller inputs in response to tilting displacement of the swashplate about the swashplate tilt axis, wherein the sensor shaft is different from and parallel to the motor shaft, and
   a displacement amplifier between the swashplate and the angle sensor, the displacement amplifier amplifying tilting displacement of the swashplate and communicating the amplified tilting displacement to the angle sensor.

2. A pump control system as set forth in claim 1, in which the displacement amplifier transmits displacement and torque between the swashplate and the angle sensor.

3. A pump control system as set forth in claim 1, in which the displacement amplifier transmits driving torque between the electric motor and the swashplate.

4. A pump control system as set forth in claim 1, in which the displacement amplifier is a mechanical displacement amplifier.

5. A pump control system as set forth in claim 1, in which the displacement amplifier includes rotating displacement amplifying components that engage and drive one another.

6. A pump control system as set forth in claim 1, in which the displacement amplifier includes a flexible member.

7. A pump control system as set forth in claim 6, in which the displacement amplifier includes a first sprocket drivingly connected to the angle sensor and a second sprocket driving connected to the swashplate, the flexible member extends between the first and second sprockets, and the first sprocket is substantially smaller than the second sprocket whereby rotation of the second sprocket causes substantially greater rotation of the first sprocket.

8. A pump control system as set forth in claim 1, in which the displacement amplifier includes an arcuate gear segment fixed to the swashplate for tilting displacement with the swashplate, wherein the arcuate gear segment has teeth disposed on an interior peripheral surface thereof.

9. A pump control system as set forth in claim 8, in which the displacement amplifier includes a pinion fixed to the sensor shaft of the angle sensor, wherein the pinion has respective teeth disposed on an exterior peripheral surface thereof and configured to operatively mesh with corresponding teeth disposed on the interior peripheral surface of the arcuate gear segment, the arcuate gear segment and the pinion each have a tooth root diameter, and the root diameter of the arcuate gear segment is substantially greater than the root diameter of the pinion.

10. A pump control system as set forth in claim 9, in which the angle sensor includes a string sensor and a pulley, and the pulley transmits torque between the pinion and the string sensor.

11. A pump control system as set forth in claim 1, in which the angle sensor includes a string sensor.

12. A pump control system as set forth in claim 1, in which the swashplate type axial piston hydraulic pump is an over center swashplate type pump.

13. A pump control system as set forth in claim 1, further including a zero turn vehicle having prime mover and a hydrostatic transmission, the hydrostatic transmission includes the swashplate type axial piston hydraulic pump, and the prime mover is drivingly connected to rotate the barrel of the pump.

14. A pump control system as set forth in claim 1, wherein the displacement amplifier is configured to amplify a torque output of the electric motor that displaces the swashplate, such that a torque amplification ratio is different from a displacement amplification ratio.

15. A method of controlling an axial piston hydraulic pump having a swashplate, the method comprising the steps:

providing an electric motor drivingly connected to the swashplate of the pump to tilt the swashplate about a swashplate tilt axis, providing an electrical controller generating command signals in response to controller inputs and communicating the command signals to the electric motor to control the electric motor, communicating operator input to the controller to provide one of the controller inputs, amplifying swashplate tilting displacement via a displacement amplifier, wherein the displacement amplifier includes (i) an arcuate gear segment fixed to the swashplate, wherein the arcuate gear segment has teeth disposed on an interior peripheral surface thereof, and (ii) a pinion fixed to a sensor shaft of an angle sensor, wherein the pinion has respective teeth disposed on an exterior peripheral surface thereof and configured to operatively mesh with corresponding teeth disposed on the interior peripheral surface of the arcuate gear segment, generating an amplified swashplate tilt signal proportional to the amplified swashplate tilting displacement, and communicating the amplified swashplate tilt signal to the controller to provide another one of the controller inputs.

16. A method as set forth in claim 15, which includes the step of transmitting driving torque between the electric motor and the swashplate using a first sprocket drivingly connected to the electric motor, a second sprocket drivingly connected to the swashplate, and a flexible member extending between the first and second sprockets.

17. A method as set forth in claim 15, in which generating the amplified swashplate tilt signal further includes converting a mechanical amplified swashplate tilt signal to an electrical signal proportional to the mechanical amplified swashplate tilting displacement.

18. A method as set forth in claim 15, wherein the arcuate gear segment and the pinion each have a tooth root diameter, and the root diameter of the arcuate gear segment is greater than the root diameter of the pinion.

* * * * *